United States Patent Office 3,781,436
Patented Dec. 25, 1973

3,781,436
THERAPEUTIC COMPOSITIONS
Corneliu Edmond Giurgea, Brussels, Belgium, assignor to UCB, Societe Anonyme, Saint-Gilles-lez-Brussels, Belgium
No Drawing. Filed Oct. 20, 1971, Ser. No. 191,063
Claims priority, application Great Britain, Oct. 22, 1970, 50,215/70
Int. Cl. A61k 27/00
U.S. Cl. 424—258    8 Claims

ABSTRACT OF THE DISCLOSURE

A pharmaceutical composition comprising a pharmaceutical excipient and a therapeutically effective amount of a 1,4 - dihydro-1,4-etheno-isoquinolin-3(2H)-one having the formula

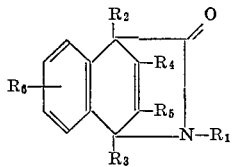

wherein $R_1$, $R_2$, $R_3$, $R_4$ and $R_5$ are each a member selected from the group consisting of hydrogen, alkyl, hydroxyalkyl, aminoalkyl, alkylaminoalkyl, dialkylaminoalkyl, said alkyl having 1 to 4 carbon atoms, alkenyl having 2 to 4 carbon atoms, aryl and aralkyl; and $R_6$ is a member selected from the group consisting of hydrogen, halogen, alkyl and alkoxy having 1 to 4 carbon atoms and trifluoromethyl.

---

The present invention is concerned with the use of 1,4-dihydro - 1,4 - etheno-isoquinolin-3(2H)-ones as medicaments which can be used for the treatment of disorders of the central nervous system in man: troubles of wakefulness, disorders of equilibrium and vertigo, psychosomatic syndromes, neuroses, disorders due particularly to senility, psychoses accompanied by delirium and hallucinations and as an analgesic. The present invention is also concerned with pharmaceutical compositions prepared from these 1,4-dihydro - 1,4 - etheno-isoquinolin-3(2H)-ones.

The 1,4-dihydro-1,4-etheno-isoquinolin-3(2H)-ones, the therapeutic use of which constitutes one of the objects of the present invention have the general formula:

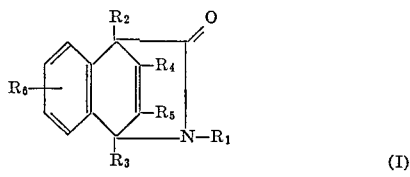

wherein $R_1$, $R_2$, $R_3$, $R_4$ and $R_5$, are each a member selected from the group consisting of hydrogen, alkyl, hydroxyalkyl, aminoalkyl, alkylaminoalkyl, dialkylaminoalkyl, all alkyl groups of which having 1 to 4 carbon atoms, $C_2$–$C_4$ alkenyl, aryl and aralkyl and $R_6$ is a member selected from the group consisting of hydrogen, halogen, $C_1$–$C_4$ alkyl, $C_1$–$C_4$ alkoxy and trifluoromethyl.

From the point of view of nomenclature, the compounds with which the present invention is concerned may also be considered as being 5,6-benzo-2-azabicyclo-(2,2,2)-oct-7-en-3-ones. They are new compounds, with the exception of the derivatives in which $R_1$ is a methyl radical and $R_2$, $R_3$, $R_4$ and $R_5$ represent separately a methyl group (E. B. Sheinin et al., J. Heter. Chem. 5, (1968), 859). However, this article does not mention any pharmacological study of these methylated derivatives.

It is possible to prepare the compounds used according to the present invention in which $R_1$ is an alkyl radical and $R_2$, $R_3$, $R_4$ and $R_5$ are hydrogen atoms or alkyl radicals, by the method of synthesis described by Sheinin et al. (loc. cit.). However, it is preferable to use a more general process comprising reacting, by a Diels-Alder reaction, an $R_4$,$R_5$-substituted maleic anhydride with an $R_1$,$R_2$,$R_3$,$R_6$-substituted isoquinolin-3-one, hydrolyzing the two carbonyl groups of the intermediate addition compound thus obtained to give two carboxyl groups and subjecting the hydrolyzed product to an oxidative decarboxylation, to give compounds of General Formula I, wherein the symbols $R_1$ to $R_6$ have the meanings given above. This latter process, which forms the subject of my copending British patent application No. 50,214/70, presents the double advantage, as compared with the method of Sheinin et al. (loc. cit.) of giving, on the one hand, better yields of desired products of Formula I and, on the other hand, of permitting the synthesis not only of the N-alkyl-substituted derivatives (method of Sheinin et al., loc. cit.), but also of those in which $R_1$ is a hydrogen atom.

However, when the appropriate substituted isoquinolin-3-ones are not easily available, the process of Sheinin (loc. cit.) may be used, in particular for the preparation of the following compounds with which the invention is concerned:

(B) 1,4-dihydro-1,2-dimethyl - 1,4 - etheno-isoquinolin-3(2H)-one M.P. 84–85° C. (Sheinin, loc. cit.: 79–83° C.)

(C) 1,4-dihydro - 2,10 - dimethyl-1,4-etheno-isoquinolin-3(2H)-one M.P. 133–134° C. (Sheinin, loc. cit.: 126–129° C.)

(D) 1,4-dihydro - 2,9 - dimethyl-1,4-etheno-isoquinolin-3(2H)-one M.P. 124–125° (Sheinin, loc. cit.: 99–102° C.)

(E) 1,4-dihydro - 2,4 - dimethyl-1,4-etheno-isoquinolin-3(2H)-one M.P. 96–97° C. (Sheinin, loc. cit.: 92.5–95° C.)

These four compounds were characterized by percentage elemental analysis, infrared spectrum and mass spectrum (study of the ionization products).

(F) 1,4-dihydro-2,6,7-trimethyl - 1,4 - etheno-isoquinolin-3(2H)-one M.P. 146–147° C.

(G) 1,4-dihydro-2,5,6-trimethyl - 1,4-etheno-isoquinolin-3(2H)-one M.P. 103° C.

(H) 1,4-dihydro - 2,7,8 - trimethyl-1,4-etheno-isoquinolin-3(2H)-one M.P. 115–116° C.

The compounds G and H were separated by chromatography on alumina column.

Their structures were confirmed by infrared, NMR and mass spectra.

(I) 1,4-dihydro-2-phenyl-1,4 - ethene-isoquinolin-3(2H)-one M.P. 115° C.

(J)

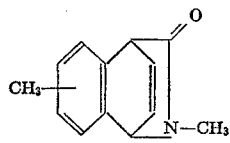

gas chromatography: 1 peak infrared spectrum compatible chromatography: a stain mass spectrum: M.W. Calc. 199. Found 199.

(K)

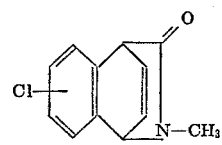

gas chromatography: 1 peak infrared spectrum compatible chromatography plate: a stain analysis: $C_{12}H_{10}ClNO$. Calc.: C, 65.6%; H, 4.56%; N, 6.36%. Found: C, 66.2%; H, 4.75%; N, 6.24%.

(L)

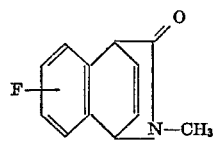

gas chromatography: 1 peak mass spectrum: M.W. Calc. 203. Found 203.

(M)

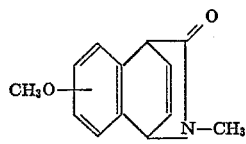

gas chromatography: 1 peak infrared spectrum compatible mass spectrum: M.W. Calc. 215. Found 215.

Analysis: $C_{13}H_{13}NO_2$. Calc.: C, 72.5%; H, 6.04%; N, 6.51%. Found: C, 71.8%; H, 6.08%; N, 6.43%.

PHARMACOLOGIC TESTS

The compounds of Formula I have a pharmacological activity, as shown by the tests given below, in which there is used, as a representative of the compounds of this class, 2-methyl-5,6-benzo-2 - azabicyclo-(2,2,2)-oct-7-en-3-one (N-methyl-1,4-dihydro - 1,4 etheno-isoquinolin - 3(2H)-one), which is referred to below as Product A.

(1) General behavior of the mouse.—(S. Irwin, "General Philosophy and Methodology of Screening: A Multidimensional Approach," Gordon Research Conference on Medicinal Chemistry, Aug. 3–7 (1959) at Colby Junior College, New London, U.S.A.)

Progressive doses of Product A are administered by the peritoneal route to groups of three male mice (weighing from 18 to 22 gms.) and the behavior of the animals is observed according to the classic criteria.

With Product A, there is observed a slight tranquillization from 185 mg./kg. body weight. Death occurs at a dose of 1110 mg./kg. body weight.

(2) Inhibition of the extensor reflex in the rat. (P. Janssen et al., J. Med. Pharm. Chem. 1, (1959), 281.) After administration of Product A, the $ED_{50}$ in the rat by the peritoneal route is 193 mg./kg. body weight.

(3) Potentialization of sleep induced in the mouse by pentobarbital. (P. Janssen et al., J. Med. Pharm. Chem. 1, (1959), 281.) The oral dose of Product A which causes one-half of the mice to fall asleep after the administration of a subliminal dose of pentobarbital is greater than 104 mg./kg. body weight.

(4) Inhibition of muricidal behavior in the rat. (P. Karli, Behaviour (Leyden), 10, (1956), 81.) A fraction of the normal population of rats have a muricidal behavior. It is possible to define the dose of a product which prevents one-half of the animals from showing this behavior. The inhibition takes place for Product A at a dose of 96 mg./kg. two hours after peritoneal administration.

(5) Inhibition of aggressive behavior induced in the mouse by isolation. (S. Garattini and E. B. Sigg, Excerpta Medica Foundation, Amsterdam, Elsevier, 1969: article "Aggressive Behavior," by L. Valzelli, page 70.) The dose which, when administered per os, inhibits the attack of the intruder in one-half of the animals after 30 minutes is 235 mg./kg. body weight for Product A.

(6) Amygdalian post-discharges in the rabbit. (M. Monnier and H. Gangloff, "Atlas for Stereotaxic Brain Res. on the Conscious Rabbit," Elsevier, 1961, Amsterdam.) Stainless steel electrodes were placed, according to the stereotaxic method of Monnier and Gangloff (loc. cit.), on the cerebral cortex (above the motor zone and the limbic visual interzone) and in the following subcortical structures: amygdalae, dorsal hippocampus and dorso-median thalamus.

The electrogram, with bipolar leads in all these structures, was recorded before and during the two hours following administration of the product.

After determining the thresholds (stabilized for one hour), the Product A was administered per os and its action was observed on the thresholds, the duration, the projections and the morphology of the post-discharges. At the dosage rates of 51 and 59 mg./kg. body weight, there was observed an inhibition of the amygdalian post-discharges with an elevation of the threshold. At a higher voltage, the duration, amplitude and morphology remain unchanged.

(7) Initial performance test in the rat. (Unpublished original method of the applicants.) When preparing the rats for a conditioned reflex, the animal is taught an avoidance reaction by running away in response to an electric shock lasting 3 seconds, repeated several times per minute over a period of a few minutes. The innate running away reaction takes place before the end of the shock 15 to 20 times out of 20 tests.

A few hours later, the training is repeated and a reduction in the avoidance performances is observed. This is interpreted as an expression of a conflicting situation which diminishes the performance during the second time round. Anxiolytic substances oppose this effect.

Product A, after administration by peritoneal route, improves the performance from a dose of 1.8 mg./kg. body weight.

For the following compounds according to the invention, the dose which improves the performance is

| Compounds: | Mg./kg. |
|---|---|
| (C) | 4 |
| (F) | 7 |
| (H) | 40 |
| (K) | 22 |
| (L) | 20 |
| (M) | 21 |
| (N) | 2.1 |
| (O) | 21 |
| (P) | 27 |

Compounds N, O, P are respectively the N-allyl-, N-hydroxyethyl- and N-diethylaminoethyl-derivatives of 1,4-dihydro-1,4-etheno-isoquinolin-3(2H)-one, prepared acording to my British Pat. application No. 50,214/70 mentioned above.

(8) Audiogenic seizure in mice. (E. A. Swinyard, "Some Physiological Properties of Audiogenic Seizure in Mice and Their Alteration by Drugs," "Psychophysiologie, Neuropharmacologie et Biochimie de la Crise Audiogene," p. 405–421. Ed. Centre Nat. Rech. Scient., Paris, 1963.)

Mice sensitive to audiogenic seizure were subjected to a sonorous stimulation of an intensity of 85 decibels for a period of 2 minutes. The seizure takes place in three phases: a period of latency followed by racing, a tonic clonic seizure and finally clonic shocks.

Product A is injected by the peritoneal route and the animals are subjected to an acoustic stimulus 30 minutes, 60 minutes, 2 hours and 4 hours after the injection.

Under these conditions, Product A protects the animal at a dose of 20 mg./kg. body weight for 1 hour and at a dose of 59 mg./kg. body weight for 4 hours against the tonicoclonic and clonic phases of the audiogenic seizure.

The active dose for the following compounds according to the invention is:

| Compound: | Active dose (mg./kg.) | Time of protection (in minutes) |
|---|---|---|
| (B) | 20 | 30 |
| (C) | 64 | 30 |
| (D) | 64 | 120 |
| (E) | 20 | 120 |
| (K) | 66 | 120 |
| (Q) | 53 | 60 |
| (R) | 64 | 240 |
| (S) | 83 | 240 |

NOTE.—The three last Compounds (Q), (R) and (S) are respectively 1,4-dihydro-1,4-etheno-isoquinalin-3(2H)-ohe, N-ethyl-1,4-dihydro-1,4-etheno-isoquinolin-3(2H)-one and N-methyl-1,4-dihydro-9-phenyl-1,4-etheno-isoquinolin-3(2H)-one, prepared according to my British patent application No. 50,214/70 mentioned above.

(9) Central nystagmus in rabbits. (C. Giurgea et al., "Action of Some Antimotion Sickness Drugs on Central Nystagmus," Med. Exp., 9, (1963), 361–370; J. Lachman et al., "Central Nystagmus Elicited by Stimulation of the Mesodiencephalon in the Rabbit," Am. J. Physiol. 193, (1958), 328–334.)

Product A inhibits the central nystagmus induced in the rabbit by the electrical stimulation of the nystagmogenic zone. When administered per os, at the dosage rate of 103 mg./kg. body weight, it brings about an elevation of the threshold of the induced movements.

Conclusion of the tests

Because of its properties of regulating the central nervous system as manifested (a) in the anticonvulsive actions, by the protection observed in the audiogenic seizure (test 8), (b) in anxiolysis, by the results of the initial performance tests (test 7), (c) in the field of nervous integration, by its influence on the central nystagmus (test 9) and the limbic system (tests 4, 5, 6), Product A may be used in disturbances of wakefulness, in disorders of equilibrium and in cases of vertigo.

These properties are in addition to the tranquillizing and sedative actions of the Product A (1, 2, 3) which extend its action to (a) the treatment of psychosomatic syndromes; (b) the treatment of neuroses, disorders due to senility and others and (c) the treatment of psychoses involving delirium and hallucinations.

Furthermore, the sedative action of Product A and its action in regulating the central nervous system suggest a possible analgesic action.

Toxicity

For Product A, the $LD_{50}$ in the mouse by the oral route is: 1150 mg./kg. body weight For Product A, the $LD_{50}$ in the rat by the oral route is: 806 mg./kg. body weight For Product A, the $LD_{50}$ in the rat by the peritoneal route is: 531 mg./kg. body weight.

Therapeutical index

Measured by the peritoneal route in rats, the therapeutical index of Product A is:

$$\frac{toxicity}{initial\ performance} = \frac{531}{1.8}$$

CLINICAL TESTS

In the examination of the activity of the compounds of the invention on the electroencephalogram (amplitude and frequency), it was observed that the intravenous dose of 160 mg. induces a pronounced increase in the frequencies 8.3 c./s. and 10.3 c./s. and an increase in the amplitude alpha. These modifications are not accompanied by any irritative sign nor any neurovegetative manifestation.

It is at present established that, at the clinically effective doses any psycho-active drug must induce qualitative and quantitative modifications in the electroencephalogram both to amplitude and frequency.

The compounds of the present invention consequently have potentials in the field of activity on the central nervous system and more particularly in the neuropsychiatric sphere.

The compositions according to the present invention, which can be used for oral administration, may be solid or liquid, for example in the form of tablets, pills, dragees, capsules in gelatine, solutions, syrups or the like. Likewise, the compositions for use by parenteral administration are the known pharmaceutical forms for this type of administration, for example solutions, suspensions or aqueous or oily emulsions. For administration by rectal route, the compositions of the present invention generally take the form of suppositories.

The pharmaceutical forms, such as solutions for injection, suspensions for injection, tablets, drops, suppositories are prepared by the methods currently used by pharmacists. The compounds to be used according to the present invention are mixed with a solid or liquid vehicle, which is nontoxic and pharmaceutically acceptable, and optionally with and pharmaceutically acceptable, and optionally with a a dispersing agent, a disintegrating agent, a lubricant, a stabilizer or the like. If necessary, it is possible to add preservatives, sweeteners, coloring materials and the like.

Likewise, the solid or liquid pharmaceutical vehicles used in these compositions are well known in the art. Solid pharmaceutical excipients for the preparation of tablets or capsules include, for example, starch, talc, calcium carbonate, lactose, sucrose, magnesium stearate and the like.

The percentage of active product in the pharmaceutical compositions may vary within very wide limits according to the conditions of use, particularly according to the frequency of administration.

Human dosage is of the order of 3 × 50 mg./day but may possibly be from 20 mg. to 1 g. per day.

The following examples of compositions for oral administration are given for the purpose of illustrating the present invention.

EXAMPLE 1

Formula for tablets

| | Mg. |
|---|---|
| Product A | 50 |
| Starch | 28 |
| Avicel (microcrystalline cellulose) | 10 |
| Polyvinylpyrrolidone | 2 |
| Talc | 8 |
| Magnesium stearate | 2 |

EXAMPLE 2

Formula for capsules

| | Mg. |
|---|---|
| Product A | 50 |
| Lactose, sufficient quantity to make a capsule of size No. 2. | |

I claim:

1. A process for the treatment of disorders of equilibrium, vertigo and neuroses in man which comprises internally administering to man a therapeutically effective dose of a 1,4-dihydro-1,4-etheno-isoquinolin-3(2H)-one having the formula

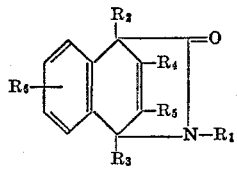

wherein:

R₁ is a member selected from the group consisting of phenyl, hydrogen, methyl, ethyl, allyl, hydroxyethyl and diethylaminoethyl, $R_2$, $R_3$ and $R_5$ are each a member selected from the group consisting of hydrogen and methyl, $R_4$ is a member selected from the group consisting of hydrogen, methyl and phenyl, and $R_6$ is a member selected from the group consisting of hydrogen, chlorine, fluorine, methyl and methoxy.

2. The process of claim 1 wherein said therapeutically effective dose is from 20 mg. to 1 gram per day.

3. The process of claim 1 wherein said 1,4-dihydro-1,4-etheno - isoquinolin - 3(2H)-one is N-methyl-1,4-dihydro-1,4-etheno-isoquinolin-3(2H)-one.

4. The process of claim 1 wherein said 1,4-dihydro-1,4-etheno-isoquinolin-3(2H)-one is administered rectally in the form of suppositories.

5. The process of claim 1 wherein said 1,4-dihydro-1,4-etheno-isoquinolin-3(2H)-one is administered orally in the form of tablets or capsules containing about 20 to about 50 milligrams of said isoquinolin-3(2H)-one and a solid non-toxic orally ingestible pharmaceutical excipient.

6. A pharmaceutical composition useful for treating disorders of equilibrium, vertigo and neuroses in man by oral administration comprising a non-toxic orally-ingestible pharmaceutical excipient and a therapeutically effective amount of a 1,4-dihydro-1,4-etheno-isoquinolin-3(2H)-one having the formula

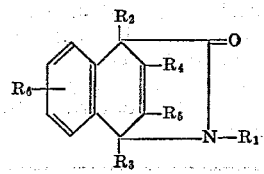

wherein:

R₁ is a member selected from the group consisting of phenyl, hydrogen, methyl, ethyl, allyl, hydroxyethyl and diethylaminoethyl, $R_2$, $R_3$ and $R_5$ are each a member selected from the group consisting of hydrogen and methyl, $R_4$ is a member selected from the group consisting of hydrogen, methyl and phenyl, and $R_6$ is a member selected from the group consisting of hydrogen, chlorine, fluorine, methyl and methoxy.

7. A pharmaceutical composition as claimed in claim 6 wherein said 1,4-dihydro-1,4 - etheno-isoquinolin-3(2H)-one is N-methyl - 1,4 - dihydro-1,4-etheno-isoquinolin-3-(2H)-one.

8. A pharmaceutical composition as claimed in claim 6 wherein said therapeutically effective amount is about 20 to about 50 milligrams.

References Cited

Chem. Abst.: vol. 73; Subj. Index, p. 1416s (1970).

STANLEY J. FRIEDMAN, Primary Examiner